US00RE45295E

(19) United States
(12) Reissued Patent
Mitchell et al.

(10) Patent Number: US RE45,295 E
(45) Date of Reissued Patent: Dec. 16, 2014

(54) SYSTEM AND METHOD FOR INTEGRATING PUBLIC AND PRIVATE DATA

(75) Inventors: Margaret C. Mitchell, Phoenix, AZ (US); John Mark Page, Phoenix, AZ (US); Philip W. Steitz, Scottsdale, AZ (US); Anthony R. Bowen, Huntington Beach, CA (US); Jeffrey S. Fehnhaber, Scottsdale, AZ (US); Fred A. Bishop, Glendale, AZ (US)

(73) Assignee: Stargazer Software, Limited Liability Company, Wilmington, DE (US)

(21) Appl. No.: 13/597,906

(22) Filed: Aug. 29, 2012
(Under 37 CFR 1.47)

Related U.S. Patent Documents

Reissue of:
(64) Patent No.: 6,941,376
Issued: Sep. 6, 2005
Appl. No.: 09/893,391
Filed: Jun. 28, 2001

U.S. Applications:
(63) Continuation of application No. 11/850,606, filed on Sep. 5, 2007, now Pat. No. Re. 43,715, which is an application for the reissue of Pat. No. 6,941,376.

(60) Provisional application No. 60/214,370, filed on Jun. 28, 2000.

(51) Int. Cl.
*G06F 15/16* (2006.01)

(52) U.S. Cl.
USPC ..... 709/229; 709/205

(58) Field of Classification Search
CPC ..... H04Q 3/0045
USPC ..... 709/200–203, 217–229, 205
See application file for complete search history.

(56) References Cited

U.S. PATENT DOCUMENTS 4,484,304 A 11/1984 Anderson et al.
5,319,542 A 6/1994 King, Jr. et al.

(Continued)

FOREIGN PATENT DOCUMENTS

EP 0 889 421 1/1999
EP 0 889 421 A 1/1999
WO WO 00/48110 8/2000

OTHER PUBLICATIONS

"Sybase Enterprise Portal Version 1.0 Over-view and User's Guide," Sybase, Internet Article, May 2000, http://download.sybase.com/pdfcos/epg0100e/ep_intro.pdf, XP002276159, pp. 1-27.

(Continued)

*Primary Examiner* — Moustafa M Meky
(74) *Attorney, Agent, or Firm* — Christensen O'Connor Johnson Kindness PLLC

(57) ABSTRACT

A system and method for allowing an Internet user to create a web page which may simultaneously display public and private data as integrated data on one digital screen or other network interface device. Integrated data may derive from at least one internal content provider, but may also include data from one or more external content providers. The invention also allows an internal content provider to create a personal profile of a user, based on proprietary data stores of the internal content provider and/or on the user's choices of data for viewing on a web page. Finally, the invention allows an internal content provider to use the personal profile to personalize the user's experience on the provider's web site.

20 Claims, 6 Drawing Sheets

(56) References Cited

U.S. PATENT DOCUMENTS

| | | | | | |
|---|---|---|---|---|---|
| 5,710,884 | A | | 1/1998 | Dedrick | |
| 5,721,852 | A | * | 2/1998 | Porter | 345/777 |
| 5,754,939 | A | | 5/1998 | Herz et al. | |
| 5,761,662 | A | | 6/1998 | Dasan | |
| 5,793,964 | A | | 8/1998 | Rogers et al. | |
| 5,796,393 | A | | 8/1998 | MacNaughton et al. | |
| 5,848,396 | A | | 12/1998 | Gerace | |
| 5,878,219 | A | | 3/1999 | Vance, Jr. et al. | |
| 5,884,272 | A | | 3/1999 | Walker et al. | |
| 5,901,287 | A | | 5/1999 | Bull et al. | |
| 5,913,214 | A | | 6/1999 | Madnick et al. | |
| 5,933,827 | A | | 8/1999 | Cole et al. | |
| 5,940,834 | A | | 8/1999 | Pinard et al. | |
| 5,944,790 | A | | 8/1999 | Levy | |
| 5,946,676 | A | | 8/1999 | Iggulden | |
| 5,958,016 | A | | 9/1999 | Chang et al. | |
| 5,963,371 | A | * | 10/1999 | Needham et al. | 359/464 |
| 5,983,227 | A | | 11/1999 | Nazem et al. | |
| 5,987,252 | A | * | 11/1999 | Leino et al. | 717/126 |
| 5,991,735 | A | | 11/1999 | Gerace | |
| 5,995,939 | A | | 11/1999 | Berman et al. | |
| 5,995,943 | A | | 11/1999 | Bull et al. | |
| 5,999,975 | A | | 12/1999 | Kittaka et al. | |
| 6,012,090 | A | | 1/2000 | Chung et al. | |
| 6,014,638 | A | | 1/2000 | Burge et al. | |
| 6,020,884 | A | | 2/2000 | MacNaughton et al. | |
| 6,026,429 | A | | 2/2000 | Jones et al. | |
| 6,026,433 | A | | 2/2000 | D'Arlach et al. | |
| 6,029,182 | A | | 2/2000 | Nehab et al. | |
| 6,029,195 | A | | 2/2000 | Herz | |
| 6,055,542 | A | | 4/2000 | Nielsen et al. | |
| 6,078,928 | A | | 6/2000 | Schnase et al. | |
| 6,085,229 | A | | 7/2000 | Newman et al. | |
| 6,092,121 | A | | 7/2000 | Bennett et al. | |
| 6,128,663 | A | | 10/2000 | Thomas | |
| 6,138,142 | A | | 10/2000 | Linsk | |
| 6,154,766 | A | | 11/2000 | Yost et al. | |
| 6,157,946 | A | | 12/2000 | Itakura et al. | |
| 6,161,112 | A | | 12/2000 | Cragun et al. | |
| 6,163,799 | A | * | 12/2000 | Kambayashi et al. | 709/204 |
| 6,167,441 | A | | 12/2000 | Himmel | |
| 6,192,382 | B1 | | 2/2001 | Lafer et al. | |
| 6,195,651 | B1 | | 2/2001 | Handel et al. | |
| 6,195,684 | B1 | * | 2/2001 | Watanabe et al. | 709/204 |
| 6,199,147 | B1 | | 3/2001 | Smith et al. | |
| 6,209,007 | B1 | | 3/2001 | Kelley et al. | |
| 6,216,129 | B1 | | 4/2001 | Eldering | |
| 6,226,642 | B1 | | 5/2001 | Beranek et al. | |
| 6,236,990 | B1 | | 5/2001 | Geller et al. | |
| 6,236,991 | B1 | | 5/2001 | Frauenhofer et al. | |
| 6,237,030 | B1 | | 5/2001 | Adams et al. | |
| 6,249,790 | B1 | | 6/2001 | Babcock, Jr. | |
| 6,253,239 | B1 | | 6/2001 | Shklar et al. | |
| 6,292,790 | B1 | | 9/2001 | Krahn et al. | |
| 6,668,353 | B1 | * | 12/2003 | Yurkovic | 715/501.1 |
| 6,734,886 | B1 | | 5/2004 | Hagan et al. | |
| 6,941,376 | B2 | | 9/2005 | Mitchell et al. | |
| 6,976,210 | B1 | | 12/2005 | Silva et al. | |
| 6,981,214 | B1 | | 12/2005 | Miller et al. | |
| 7,624,038 | B1 | | 11/2009 | Wood et al. | |
| RE43,715 | E | | 10/2012 | Mitchell et al. | |

OTHER PUBLICATIONS

EPO Supplementary European Search Report dated Apr. 23, 2004, in corresponding EP Application No. 01950625.2.

Kassem and the Enterprise Team, "Designing Enterprise Applications with the Java™ 2 Platform," Enterprise Edition, Version 1.0.1, Final Release, Oct. 3, 2000, 362 pages.

Microsoft Co., Ltd, "Microsoft Digital Dashboard: An advanced Corporate Portal Proposed for Microsoft", Nikkei Information Strategy, Jan. 2000, 9(1), 75-89.

Nagai, "Web Marketing Tools", Nikkei Multimedia for Business, Feb. 1999, 44, 66-70.

PCT International Search Report mailed Dec. 17, 2001, in corresponding International Application No. PCT/US01/20663.

Saha, A., "Application Framework for e-business: Portals," Internet Article, IBM Online, Nov. 1999, http://2226.software.ibm.com/software/developer/library/portals.pdf, XP002276158, pp. 1-8.

Anonymous: "Sybase Enterprise Portal Version 1.0 Over-view and User's Guide", Internet Article, Online! May 2000, pp. 1-27, XP002276159, URL:http://download.sybase.com/pdfdocs/epg0100e/ep_intro.pdf.

Zhao, Y., "Technical Note Webentree: A Web Service Aggregator", IBM Systems Journal, IBM Corp Armonk, New York, US, vol. 37, No. 4, 1998, pp. 584-595, XP009018969, ISSN: 0018-8670.

* cited by examiner

SYSTEM AND METHOD FOR INTEGRATING PUBLIC AND PRIVATE DATA

Matter enclosed in heavy brackets [ ] appears in the original patent but forms no part of this reissue specification; matter printed in italics indicates the additions made by reissue.

CROSS REFERENCES TO RELATED APPLICATIONS

[This application claims priority to] *Notice: More than one reissue application has been filed for the reissue of U.S. Pat. No. 6,941,376. The present application is a reissue application of U.S. Pat. No. 6,941,376, and is also a continuation reissue application of U.S. application Ser. No. 11/850,606, filed Sep. 5, 2007, which is a reissue application of U.S. Pat. No. 6,941,376. U.S. Pat. No. 6,941,376 claims benefit of* U.S. Provisional Patent Application Ser. No. 60/214,370, entitled "System and Method for Integrating Public and Private Data," filed Jun. 28, 2000.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyrights whatsoever.

BACKGROUND OF THE INVENTION

1. Field of the Invention

The present invention generally relates to the display of data available over a network. More particularly, the invention provides for the integrated display of at least one item of public data and at least one item of private data.

2. Background of the Prior Art

The Internet, which comprises a vast array of computer networks distributed throughout the world, provides online service subscribers with an almost limitless supply of information. Some of this information is public, and some is private. As used herein, public information refers to data, applications, and other such information which is equally accessible by all or substantially all users of a public network. Private information refers to information which is accessible by less than substantially all users, namely by one or more authorized parties, and usually requires a user to verify his or her identity in some way (e.g., by supplying a user name and password). Public information includes, for example, the weather in Tokyo as offered by a weather information website, the price of airfares from New York to London as provided by a travel related site, and other such information. Private information includes, for example, bank account records, 401k account information, and credit card balance information. Such information is typically accessible via an appropriate financial institution, bank and/or credit card website.

Information on the Internet can also be classified as either internal or external. Internal information includes that information which is provided by a company, through a website (or other network protocol), that is proprietary to that company. External information is information that is accessible from websites other than the website of the particular company. For example, if a user visits the site of her bank and accesses various account information, she is accessing internal information. If she then wishes to check the Dow Jones Industrial Average Stock Index on a page that is not a part of the bank's website, she will be accessing external information. Any one company may include multiple internal content providers. For example, one provider within the company may provide retirement account information, another may provide mutual fund account information, and a third may provide credit card balances and a method for paying balances on the Internet.

Known systems for acquiring and displaying information are unsatisfactory in a number of respects. For example, prior art systems do not sufficiently allow an individual to access and view both public and private data simultaneously. That is, viewing combinations of public and private data usually includes jumping between two or more websites, viewing only one at a time, or using two separate digital viewing devices, such as two computer screens. While some systems integrate public and private data on one screen, these systems are limited. For example, U.S. Pat. No. 5,319,542 describes a system for ordering items from an electronic catalogue. The system of the '542 Patent does allow a user to simultaneously view items in a catalogue (public data) and an order form including purchase information (private data). Moreover, the system remains static until updated by the user and is not interactively linked to the utilities or interactive services of the catalogue business or other entities, such as business partners of the catalogue business. In other words, the system usually includes the user inputting all of the private information that she then views in her order form. Thus, private information from the company's data stores is not made automatically available to the user.

Furthermore, with the proliferation of Internet use, systems have been described which track and process user preferences so that Internet service providers (ISPs) can customize user experiences or target marketing efforts to users with specified preferences. An example of target marketing is disclosed in U.S. Pat. No. 6,157,946, the target marketing contents of which are hereby incorporated by reference. Additionally, U.S. Pat. Nos. 5,848,396 and 5,991,735 owned by Freedom of Information, Inc. and Be Free, Inc., respectively, generally disclose a computer network for providing targeting of appropriate audiences based on psychographic or behavioral profiles of the end users, and are herein incorporated by reference. To track user preferences, some prior art systems create user profiles based on direct input by the user or on an automatic analysis of the websites accessed by the user Known systems, however, do not typically automatically track both private and public data, accessed by a user, to create a user profile. Some existing systems create user profiles based on a user's consumption of public electronic data, while other existing systems create profiles based on private data manually input by the user. A system is needed that combines the two types of data to create profiles while automatically adding pre-existing data from proprietary databases. Additionally, prior art systems do not allow a company or other entity to combine proprietary data, from one or more internal content providers, and user preferences of public data as variable input to business rules to create unique, individually tailored services containing both public and private elements.

Thus, a need exists for systems that allow a user to simultaneously access and view public and private data on the same network interface device or system, such as a web page, wireless screen, other digital viewing device or printer. There is also a need for a system that automatically tracks user preferences, based on the public and private data accessed by the user and on data from one or more internal content provider data stores. Finally, a need exists for a system that allows a company to use automatically derived user preference data to personalize the user's experience on the company's website.

BRIEF SUMMARY OF THE INVENTION

The system facilitates the simultaneous access and viewing of public and private data by integrating the two forms of data. Public and private data may be accessed from at least one internal content provider, at least one external content providers or a combination of both. In other embodiments, the system allows internal content providers to create user profiles responsive to proprietary user information from their own databases and automatically-generated information regarding user preferences of information accessed from the a network. Internal content providers can then use these profiles to personalize, for example, the experiences of the customers who use their website, and/or to specifically target marketing materials to its customers.

BRIEF DESCRIPTION OF THE FIGURES

Additional aspects of the present invention will become evident upon reviewing the non-limiting embodiments described in the specification and the claims taken in conjunction with the accompanying figures, wherein like numerals designate like elements, and:

DETAILED DESCRIPTION OF EXEMPLARY EMBODIMENTS

Figure 1:
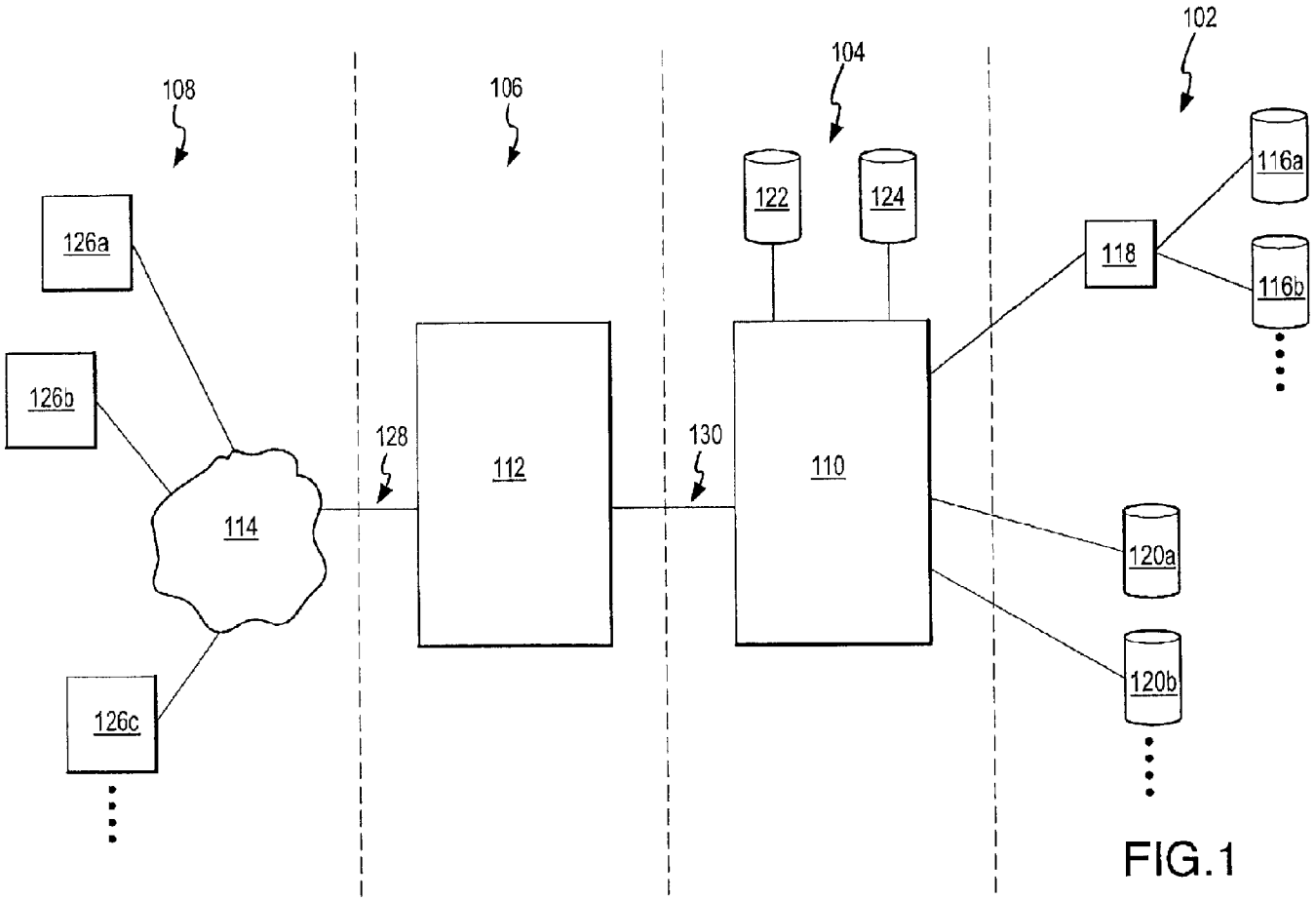
FIG. 1 is a conceptual block diagram providing an exemplary overview of the system according to one embodiment of the present invention.

A system in accordance with various aspects of the present invention facilitates simultaneously accessing and viewing public and private data from at least one content provider. In this regard, the description that follows sets forth various exemplary embodiments of the invention only, and is not intended to limit the scope, applicability, or configuration of the invention in any way. Rather, the following description is intended to provide convenient illustrations for implementing different embodiments of the invention. As will become apparent, various changes may be made in the function and arrangement of the elements described in these embodiments without departing from the spirit and scope of the invention. For example, changes may be made in the design and arrangement of the elements described in the preferred embodiments without departing from the scope of the invention as set forth in the appended claims.

The system may include a host server or other computing systems including a processor for processing digital data, a memory coupled to said processor for storing digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers. Alternatively, user system may be a personal digital assistant ("PDA"), internet enabled wireless phone or the like. User system can be in a home or business environment with access to a network. In an exemplary embodiment, access is through the Internet, through a commercially-available web-browser software package.

The host computer may provide a suitable website or other Internet-based graphical user interface which is accessible by user systems. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Oracle, MySQL, Intervase™, etc., may be used to provide database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

The present invention may be described herein in terms of functional block components, screen shots, optional selections and various processing steps. It should be appreciated that such functional blocks may be realized by any number of hardware and/or software components configured to perform the specified functions For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, PERL, with the various algorithms being implemented with any combination of data structures, objects, processes, routines or other programming elements. Further, it should be noted that the present invention may employ any number of conventional techniques for data transmission, signaling, data processing, network control, and the like.

It will be appreciated that many applications of the present invention could be formulated. One skilled in the art will appreciate that the network may include any system for exchanging data or transacting business, such as the Internet, an intranet, an extranet, WAN, LAN, VPN (virtual private network), satellite communications, and/or the like. It is noted that the network may be implemented as other types of networks, such as an interactive television (ITV) network. The users may interact with the system via any input device such as a keyboard, mouse, kiosk, personal digital assistant, handheld computer, cellular phone and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY [EXPLAINTED] *EXPLAINED* (1997). All of these texts are hereby incorporated by reference.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, VPN, Digital Subscriber Line (DSL), or various wireless communication methods. Merchant system might also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

FIG. 1 is a conceptual block diagram providing an overview of an exemplary system in accordance with one embodiment of the present invention. As shown, the system can be partitioned as a four-tier structure, including a back-end systems tier 102, an application server tier 104, a web server tier 106, and a client tier 108. The backend systems tier 102 suitably comprises, for example, one or more external content providers 116, one or more internal content providers 120, and a processor 118 coupled to the content providers 116. Each external content provider 116 and each internal content provider 120 suitably includes, for example, one or more data storage devices configured to store public and/or private information as applicable.

The data storage devices for the backend systems may be any type of data storage device, such as relational, hierarchical, object-oriented, and/or the like. Common data storage products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Application server 110 is any hardware and/or software suitably configured to process messages from and to web server tier 106 and back-end systems tier 102. More particularly, in an exemplary embodiment, application server tier 104 suitably includes an application server 110 coupled to a personal preferences data store 122 and a personal profile data store 124 (e.g., a lightweight directory access protocol database, or "LDAP"). In the illustrated embodiment, each external content provider 116 from the backend systems tier 102 is suitably connected to the application server via processor 118, and each internal content provider 120 is suitably connected to application server 110. Personal preferences data store 122 and personal profile data store 124 are also suitably coupled to application server 110.

Figure 2:
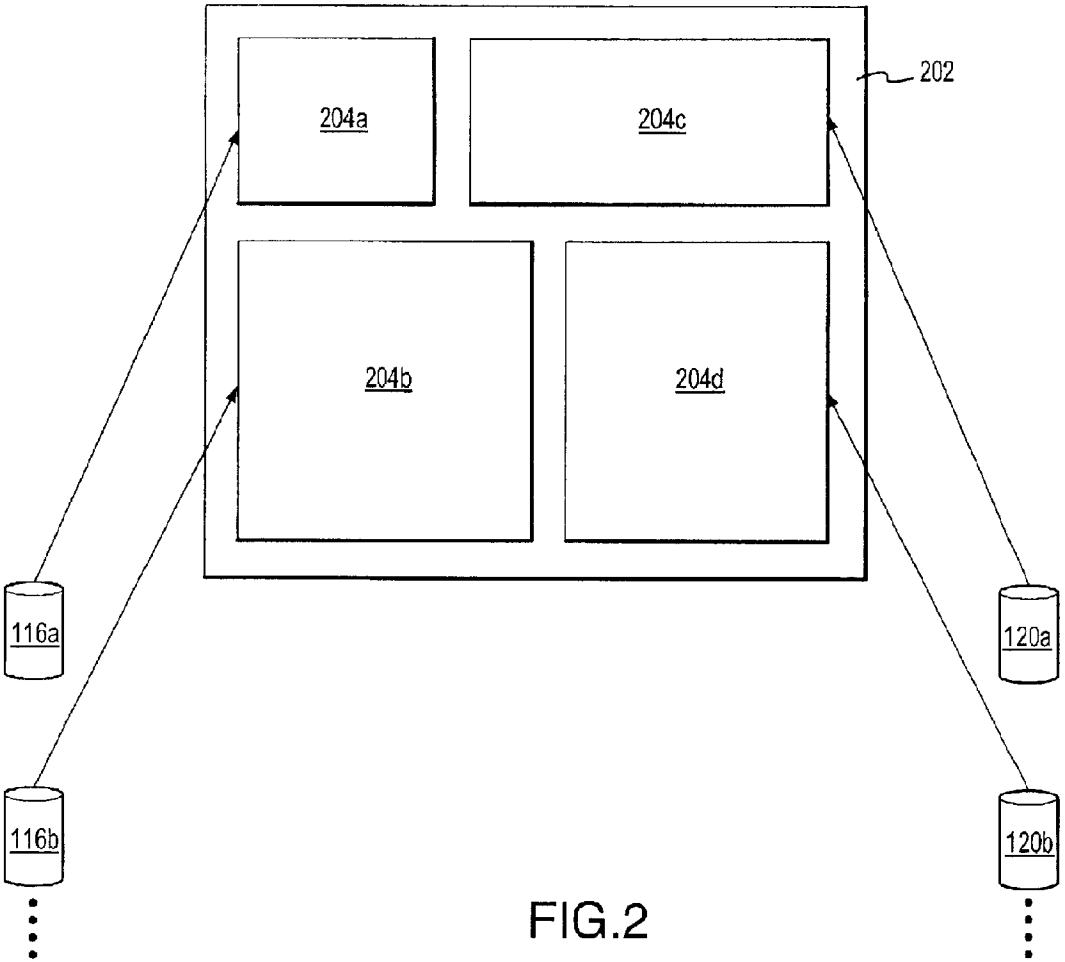
FIG. 2 is a conceptual block diagram depicting an exemplary integration of information from multiple internal and external content providers on one digital display.

Referring now to FIGS. 1 and 2, an exemplary display 202, produced by the system of FIG. 1 (e.g., a web page displayed on a computer monitor), includes integrated data 204 from various internal content providers 120 and external content providers 116 (FIG. 1). In one embodiment of the present invention, integrated data 204 may comprise data from one or more internal content providers 120 and data from one or more external content providers 116. Alternatively, integrated data 204 may derive only from one or more internal content providers 120, with no integrated data 204 from any external content provider 116. Integrated data 204 comprises at least one item of public data and at least one item of private data. In one embodiment, integrated data 204 is interactively or automatically updated in accordance with any changes, modifications, or updates that might occur at the respective internal or external content providers 120 or 116. Interactive updating refers to pulling data from data stores by a user system 126, such as when user system 126 requests a credit card balance. Automatic updating refers to pushing data out of a data store to user system 126 without the user system 126 requesting it, for example if user system 126 is automatically provided with the Dow Jones Industrial Average.

In one embodiment of the present invention, one or more internal content providers 120 include a proprietary data store of an organization (e.g., a company, educational institution, financial institution, or the like). Typically, internal content providers 120 are selected from a suite of services offered by one of internal content providers 120. For example, a user may choose to display brokerage services, card balances, and 401K account information from a list of available information made accessible by a financial institution corresponding to internal content provider 120. In one embodiment of the present invention, each site aggregates network users 126 to create what is referred to as a web portal Portals may be configured to provide access to content and functionality centered around common interests or may differ in their focus and objectives. Thus, the system according to the present invention suitably integrates public and private data into integrated data 204, which is displayed on user system 126, for example a single customizable page on one digital display 202, and which reflects a network user's preferences.

Having thus given an overview of the present invention, a detailed description of its various components will now be provided.

Application Server

As mentioned briefly above, application server 110 is any hardware and/or software suitably configured to process messages from and to web server tier 106 and back-end systems tier 102. In accordance with one embodiment of the present invention, application server 110 uses Java or any type of general purpose programming language that supports the creation of dynamic web page content. In accordance with one embodiment of the present invention, general application server 110 utilizes Java Server Pages ("JSPs") and JavaBeans to populate web forms with local databases, client/server databases, and legacy databases to access multiple server resources. JSPs enable developers to effectively separate HTML coding from the business logic in web pages. Furthermore, various companies, e.g. IBM, have developed extensions to the JSP specification that include JSP tags, which are HTML-like and can be used to access databases, and reusable Java components, such as servlets and JavaBeans. For further information regarding such details, see, for example, NICHOLAS KASSEM AND THE ENTERPRISE TEAM, DESIGNING ENTERPRISE APPLICATIONS WITH THE JAVA 2 PLATFORM, ENTERPRISE EDITION (2000), which is hereby incorporated by reference. The web forms, including, infer alia, Java applets, are exposed to the user's browser and are then transferred through the various JSPs to a collection of Java Servlets. Java Servlets are then transferred to an MQ Series connector, a TCP/IP connector, or a JDBC (Java Database Connector). Data then travels from the MQ Series connector to a transaction server and then to a legacy application and, subsequently, legacy databases. Other data travels from the TCP/IP connector to TCP/IP sockets and then to client/server applications and, subsequently, client/server databases. Still other data travels from the JDBC to local databases. In accordance with one aspect of the present invention, Java components are suitably created to provide HTML authors with component names and attributes, wherein the appropriate database administrators provide HTML authors with the name of the database to be accessed along with table information.

An additional feature of application server tier 104, according to one embodiment of the present invention, is the internal "smart-caching" of data. Smart-caching allows rules to be associated with data elements, defining when the distributed system must expend the additional overhead to make a new call to the system of record, rather than using a previously cached set of information. For example, in the context of a credit card provider with a rewards system, if it is known that updates of loyalty rewards points are only done monthly, when an additional request for rewards data is made within the month, the cached data is returned, thus improving performance and system load.

Referring to FIG. 1, in accordance with one embodiment of the present invention, personal profile data store 124 is connected to application server 110 and is configured to personalize the experience of network user systems 126. Specifically, user system 126 communicates with personal profile data store 124 by making a request over network 114. Such requests are referred to as "binding requests." Binding requests may include, for example, the user's data store current version, the method of authentication, and any credentials for authentication. Personal profile data store 124 then receives the binding request and accesses backend functions for a return reply. In one embodiment, the system stores user system's 126 profile in a personal profile data store 124 and uses the information to dynamically create a customized page.

In one embodiment of the invention, after the application is loaded, a servlet continues to wait for additional user system 126 requests. Servlet aliases may be used to provide multiple instances of a servlet for each request. The functionality of a servlet includes, for example creating and returning an entire HTML page containing dynamic content based on the nature of user system's 126 request; creating a portion of an HTML page or HTML fragment that can be embedded in an existing HTML page; communicating with other servlets; handling connections with multiple user systems 126; filtering data for special processing such as image conversion; and providing customized processing to any of web server's 112 standard routines.

Any convenient set of hardware and/or software components may be configured in order to provide the functionality of application server 110, personal preferences data store 122, and personal profile data store 124. For example, in one embodiment, a Sun Enterprise 450 server can be used, equipped with one to four Ultra-SPARC-II processors, 128 MB to 4 GB total memory capacity, Solaris 2.6 operating system, IBM WebSphere application server 3.5.

Web Server

Web server 112 is any hardware and/or software suitably configured to provide a web service to network user systems 126 and/or to interface with network 114 and application server 110. In the illustrated embodiment, application server 110 is connected, via a suitable data connection 130, to web server 112 within the web server tier 106. In accordance with a preferred embodiment of the present invention, web server 112 uses servlets to provide a framework for creating applications that implement a request/response paradigm. As mentioned above, in an exemplary embodiment, a servlet is a server side component, written in Java, that dynamically extends the functionality of a server. Servlets are used to extend a web server's 112 capabilities by creating a framework for providing request and response services over the network. In one embodiment of the present invention, network user system 126 sends a request to web server 112 and the server 112 sends the request information to a Java servlet. The servlet can be loaded automatically when the application is loaded or can be loaded the first time a user system 126 requests its services. The servlet dynamically builds a response according to the user system's 126 request by utilizing other server 112 resources, including databases and Java-enabled applications. The servlet then passes a response to the web server 112, which sends the response back to the user system 126.

A variety of hardware and/or software components may be configured to implement the functionality of web server 112. For example, in one embodiment, a Sun Enterprise 450 server can be used, equipped with one to four Ultra-SPARC-II processors, 128 MB to 4 GB total memory capacity, Solaris 2.6 operating system, Netscape Enterprise Web Server.

Network and User Systems

According to one embodiment of the present invention, web server 112 is connected to network 114 via a web/network connection 128. Network 114, in turn, is connected to one or more network user systems 126. In one embodiment of the invention, network user systems 126 access the network 114 via the Internet or other global communications system. Alternatively, users may choose to access network 114 via remote access. New, unregistered or opted-out network user systems 126 may be provided a default content page which user systems 126 may then customize according to their preferences, which may also be recorded in personal preferences data store 122. According to one embodiment, user systems 126 may customize multiple pages for viewing, including labeling and arranging the order of presentation. Technical and design standards may be communicated to user systems 126 to facilitate customization efforts.

Figure 6:
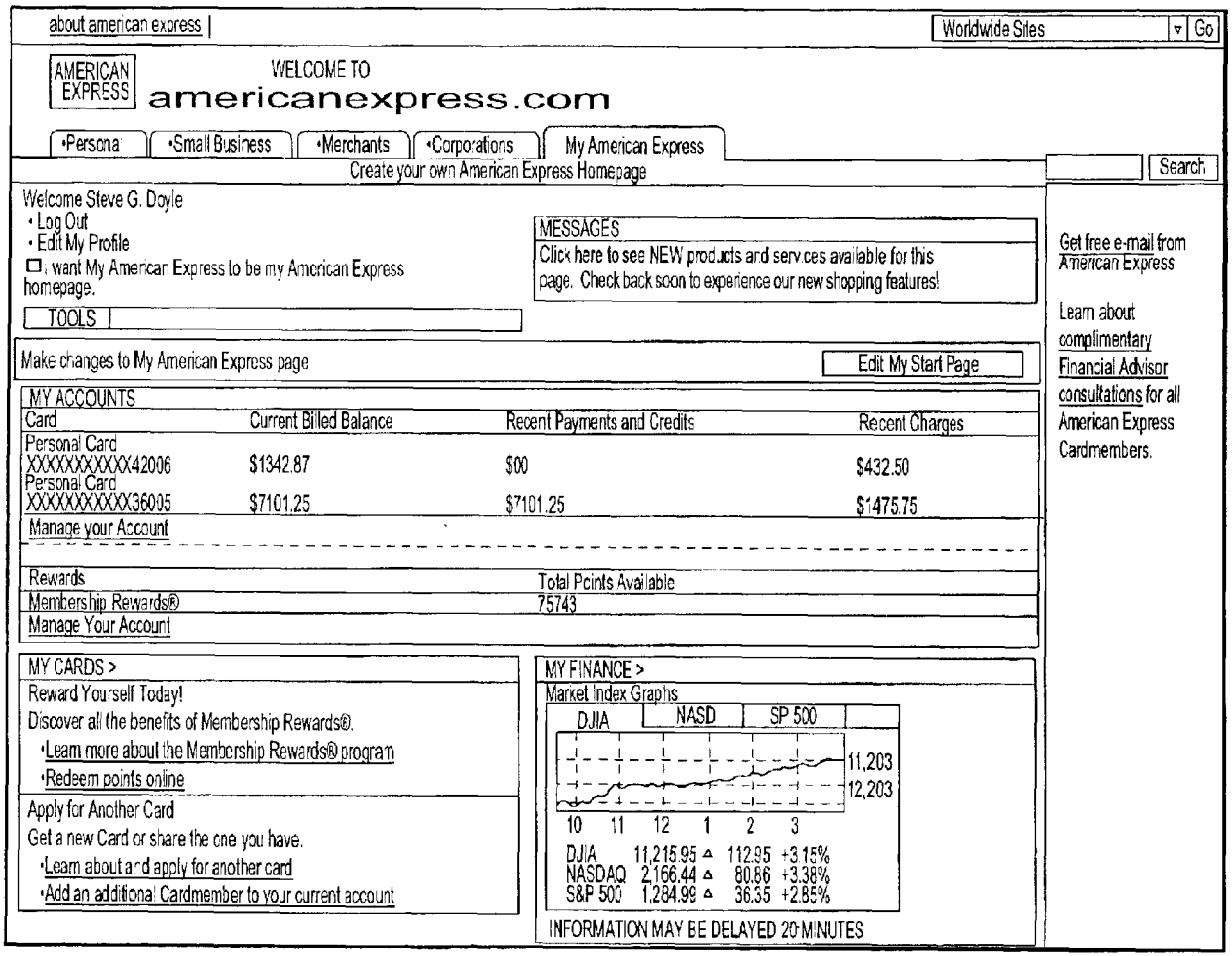
FIG. 6 is an exemplary screen shot of a personal web site created according to one embodiment of the present invention.

FIG. 6 is an exemplary screen shot of a personal web site created according to one embodiment of the present invention. This screen shot includes integrated data 204 with elements of public data and private data. Public data on the screen shot includes data under the "MY CARDS" heading, offering more information on card membership rewards and on applying for another card, and data under the "MY FINANCE" heading, showing market index graphs. Private data on the screen shot in FIG. 6 includes data under the "MY ACCOUNTS" heading, including current balances, recent payments and membership rewards points available. This screen shot is for exemplary purposes only, and it will be understood by those skilled in the art that any number of combinations of public and private data may be accessed and viewed on a user system 126 according to various embodiments of the present invention.

In accordance with one embodiment of the present invention, security for users can be created through use of a 2-firewall infrastructure. More particularly, web/network connection 128 may include an Internet firewall, and application/web connection 130 may include an intranet firewall. Thus, connections initiated by network user systems 126 are protected by an Internet firewall between network 114 and web server 112 and by an intranet firewall between web server 112 and application server 110 Network user systems 126 suitably link to network 114 through a provider web server 112 with authentication between web server 112 and application server 110. Backend systems tier 102 of enterprise information systems, provider business partners, and external services is suitably connected and protected by the Intranet firewall.

Exemplary Process

Figure 3:
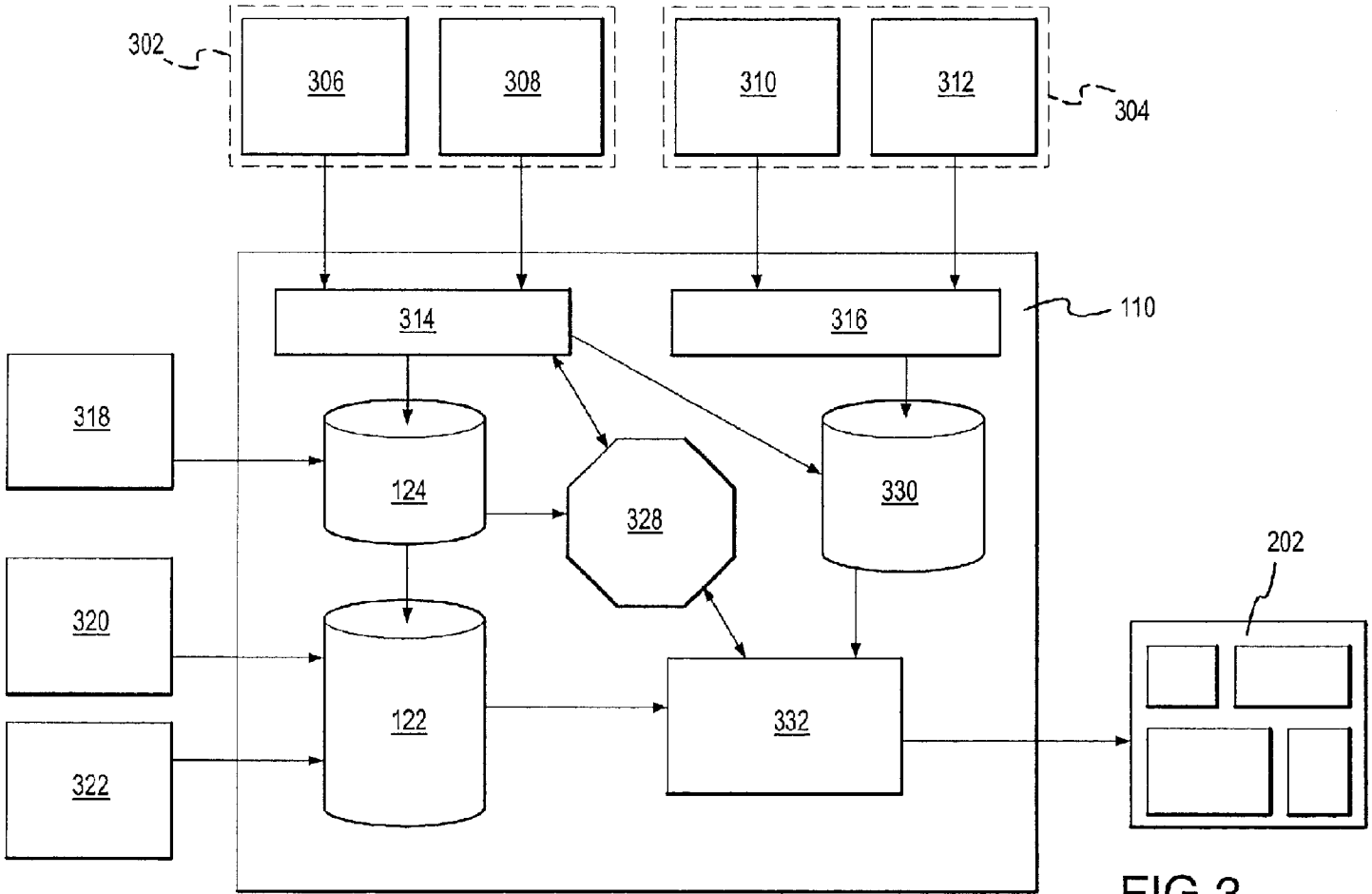
FIG. 3 is a flow diagram showing an exemplary integration of information from various sources to form a web page on one digital display.

FIG. 3 is a combination flow-chart/architectural diagram depicting an exemplary system for integrating data from various sources to form a web page on a digital display as shown in FIG. 2. In one embodiment of the present invention, this integration of data is accomplished by application server 110, personal profile data store 124 and personal preferences data store 122 (see FIG. 1). The combination of application server 110, personal profile data store 124 and personal preferences data store 122 is referred to as an application server system 334 in FIG. 3. (In FIG. 3, web server tier 106 is not depicted in order to simplify the diagram.)

In accordance with one embodiment of the present invention, a network user begins the process by entering registration/authentication data 318 in response to a request from application server 110, the results of which are suitably stored in a personal profile utility. A personal profile utility may include a personal profile data store 124 and/or a personal preferences data store and/or any other suitable means for storing and accessing personal profile data. After entering this data, and thus registering for the first time, simple authentication may be requested, including, for example, ensuring that user system 126 provides a password to the personal profile data store 124. After providing a password, user system 126 is allowed access to web server 112 on the provider's site (FIG. 1). In another embodiment, a certificate-based authentication may be used, wherein clients send certificates to personal profile data store 124 and the certificate identifies the data store client (i.e., user system 126). In one embodiment of the present invention, all points of access into the system are protected through suitable firewalls. Similarly, the system of the present invention may also provide a login-blocking capability after unsuccessful login attempts. In yet another embodiment, other authentication and security mechanisms could be added to the system. For example, one or more of three levels of security could be implemented. These levels might be based on something the user knows, such as a password, something the user has, such as a smart card, and/or something the user "is," such as a biometric fingerprint or retina scan. It will be understood that one, all or any combination of these three levels of security might be employed and that any other reliable technology for providing security to network user systems 126 may be used. For example, a combination of different levels of security might involve a card with a magnetic strip and a personal identification number, such as is used with [a] *an* ATM card.

In one embodiment of the present invention, confirmation of network user system 126 defines an identification code ("user ID"), which is then forwarded to user system 126 once registration is complete. Repeat network user systems 126 may be automatically recognized and served with the appropriate customized web page, even if they do not log in, e.g., through the use of cookies or similar technology. User systems 126 may also log in via remote access recognition. After login, user systems 126 may modify profile data such as user ID or password and account information. User systems 126 may retrieve their preferences or set their remote access code ("RAC") to retrieve preferences remotely. In one embodiment, after registering for services offered by internal content provider 120, network user system 126 is presented with a welcome page for system registration 318 and acceptance of terms and conditions. User systems 126 complete registration by providing information for the personal profile data store 124 and may select a RAC. Accessibility to any given service is restricted to user systems 126 with verified registrations. In one exemplary embodiment, registrations are verified against account records before data is shown. All points of entry into the system may be protected through at least one firewall. In one aspect of the invention, personal data is stored in a trusted domain of the web complex, with all confidential data encrypted before being transmitted over open networks.

Internal 120 and external 116 content providers may use information from personal profile data store 124 for many purposes. For example, information may be used for directing marketing efforts towards specific user systems 126. To accomplish that end, user information may be retrieved from personal profile data store 124 and special promotional messages, offers and any other suitable marketing materials are presented to user systems 126, based on that information. Similarly, internal 120 and external 116 content providers may customize the information they provide to network user systems 126, based on user profile information. This customization is accomplished through personalization rules tied to content requests by the user systems 126. For example, a holder of a particular credit card may be shown special events planned for holders of that card during a trip that the card holder has planned for a given city.

Referring again to FIG. 3, when a network user inputs registration or authentication data 318, application server 110 suitably allows user system 126 to access both transactional assets 302 and content assets 304. Transactional assets 302 comprise both company transactions 306 and business partner transactions 308. Company transactions 306 are transactions provided by internal content provider 120. Examples of company transactions 306 may include transactions provided by a credit card company, such as checking a credit card bill, 401K plan balance or brokerage account on line. Business partner transactions 308 are similar transactions provided by external content providers 116, which are business partners of internal content provider 120. Examples may include buying airline tickets or stocks on line. Content assets 304 comprise company content 310 and business partner content 312. Company content 310 is provided by internal content provider 120 and may include investment advice or savings advice from a credit card company. Business partner content 312 is provided by external content provider 116 and may include news items from Reuters news service or weather reports from weather.com.

In accordance with one embodiment of the present invention, transactional assets 302 pass through a transactional aggregation utility 314, which aggregates transactional assets 302. Application server 110 may then send aggregated transactional assets 302 to either personal profile data store 124, a security services utility 328 or a content management utility 330. Also in accordance with one embodiment, content assets 304 may pass through a content aggregation utility 316. Aggregated content assets 304 are then sent to content management utility 330.

In accordance with one embodiment of the present invention, asset aggregation is achieved via aggregation utilities 314, 316, based upon the type of asset to be integrated. External, business partner content 312, for example, may be aggregated by content aggregation utility 316, which may be a content aggregation tool such as WebMethods or any other suitable content aggregation tool. Transactional assets 302, on the other hand, may be aggregated by various methods, those methods being executed by an application server such as WebSphere or any other suitable server. According to one aspect of the present invention, web pages incorporating internal content are presented using content management utility 330. In one embodiment, transactional assets 302 and content assets 304 may be prioritized according to user preferences. Further detail is available for each screen by clicking through to selected items and an on-line reference manual is available for customization options.

According to another aspect of the invention, business unit owners can control the content and layout of subtopic areas available to network user systems 126. Internal 120 and external 116 content providers are provided with a standard mechanism to supply content to the system and a process to communicate technical and design standards. In another aspect of the invention, a set of guidelines, processes and controls for topic owners to maintain topic areas is provided. In one aspect of the present invention, transaction functionality is provided through links to existing applications. In another aspect, detailed content is presented through links to the provider web page. In one embodiment, the system provides support for transactional content.

In another embodiment of the present invention, click-stream data 320, 322 is stored in a personal preferences database 122. Click-stream data may derive from content pages 320 or transactional pages 322 accessed by a network user 126. In addition to click-stream data 320, 322, data from the personal profile data store 124 may also be transferred to and stored in the personal preferences database 122. Eventually, information such as user registration/authentication 318, transactional assets 302, content assets 304, and click-stream data 320, 322, after passing through one or more components of the application server system 334, is transmitted to an interactive presentation service 332. This interactive presentation service 332 is any hardware and/or software suitably configured to create the look and feel of network user system's 126 web site.

Figure 4:
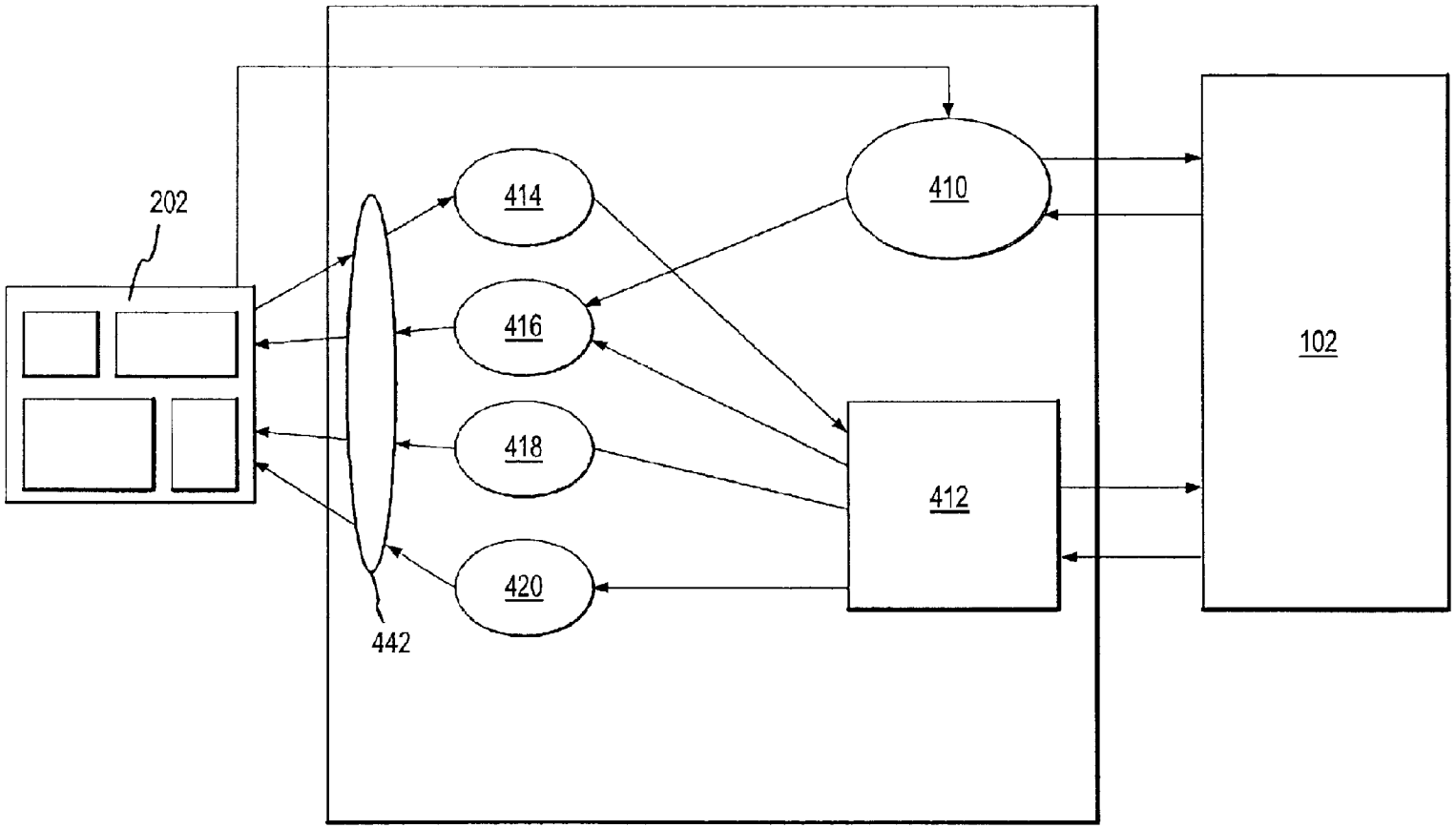
FIG. 4 is a flow diagram depicting in further detail an exemplary flow of information through the web server of the system according to the present invention.

FIG. 4 is a flow diagram depicting in further detail an exemplary flow of information through web server 112 (FIG. 1). (In FIG. 4, application server tier 104 is not shown, to simplify the diagram.) The diagram displays web server 112 architecture, which utilizes, for example, JSP integration with servlets in a command bean framework and XML document structure services create a web page on a digital display 202. In one embodiment of the present invention, information is transferred from backend systems tier 102 to either user profile access bean 410 or a messaging service 412 via HTTP 422, wherein user profile access bean 410 can be any form of personal profile service. From user profile access bean 410, information is sent to a presentation bean 416 and then, for example, to a web page on a digital display 202, wherein presentation bean 416 can be any form of data request handler. Information from messaging service 412 is transmitted to presentation bean 416, a public data access bean 418 or a private data access bean 420 and then to a web page on a digital display 202. Public data access bean 418 can be any form of public data service and private data access bean 420 can be any form of private data service. Information may also flow from a web page on digital display 202 to backend systems tier 102. Such information may pass directly to user profile access bean 410 and then to backend systems tier 102 via XML 424. Alternatively, information may be transferred from a web site to a messaging data access bean 414 and then to messaging service 412. From messaging service 412, information is then sent to backend systems tier 102 via XML 424. In one embodiment, web server 112 further includes a network security service 442. Information passing between user system 126 with digital display 202 and the various components of web server 112 described above, may first be required to pass through network security service 442.

Figure 5:
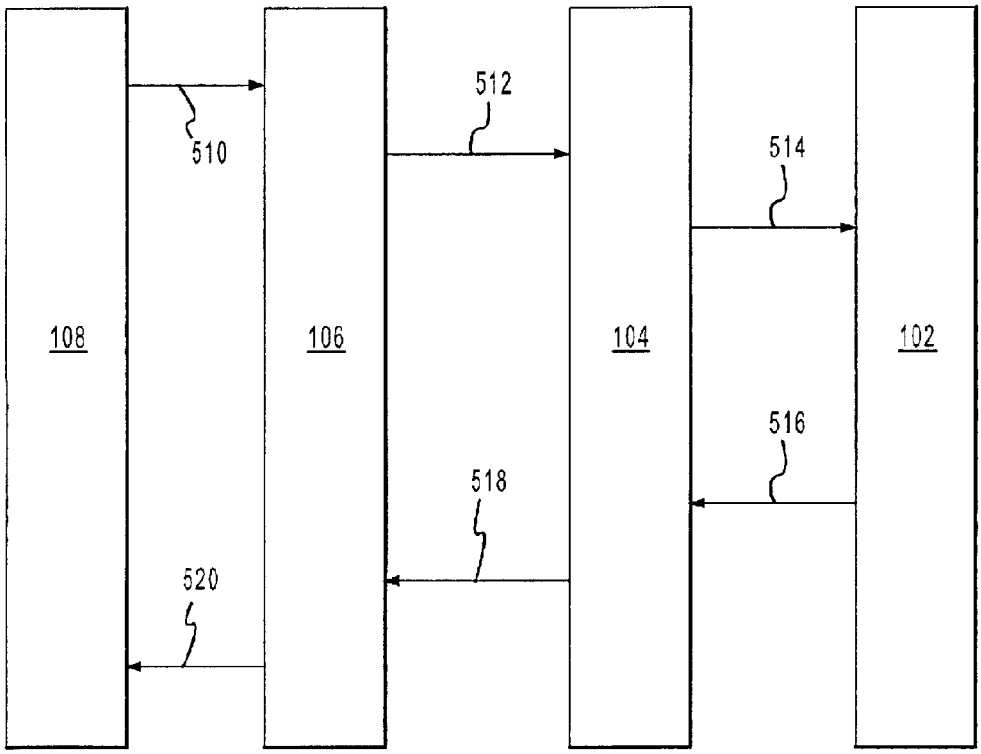
FIG. 5 is a flow diagram showing an exemplary flow of information from the client tier to the back-end tier and from the back-end tier to the client tier.

FIG. 5 is a combination flow diagram and architectural diagram showing an exemplary method of handling information flow from client tier 108 to backend systems tier 102 and from backend systems tier 102 back to client tier 108. Initially, an HTTP post/get request 510 is initiated from client tier 108 to web server tier 106. This data is then encapsulated within the presentation layer application of web server tier 106. The information is then sent via an HTTP post 512 to application server tier 104 for data acquisition and aggregation by one of the application server's business specific functions. The presentation layer elements may include, for example, any combination of JavaBeans, JSPs, Java classes, and any other convenient code hosted on web servers 106 configured to communicate with the servlets via HTTP. This process may be repeated several times in order to aggregate information on the main page. Information from client tier 108 that is processed by web server tier 106 and application server tier 104 is then sent to backend systems tier 102 via outgoing JDBC/LDAP 514. Backend systems tier 102 then processes the data and sends it back to application server tier 104 via incoming JDBC/LDAP 516. This data is then transferred to web server tier 106 as XML data 518 and to client tier 108 as HTML data 520.

In one embodiment of the present invention, to minimize coupling between the presentation and application layers, a Command Bean framework is used. As is known, command beans act as interface adapters to system components belonging to different functional domains, and provide the functionality to invoke various services in accordance with the invention. By implementing a command bean, interfaces exposed by external content providers 116 (shown in FIG. 1) can be changed independently by implementing the changes through the command beans. Multiple external content providers 116, providing similar functionality, can be integrated with the same command bean. In an alternative embodiment, each command bean may correspond to a single business logic task such as a query task, update task or any other such tasks as may be desired. With continued reference to FIG. 1, the command bean framework substantially isolates application server tier 104 from changes that could occur in the interface supported by external content providers 116. In one embodiment of the invention, the implementation of external content providers 116 or mediators that acquire data from backend systems tier 102 is modifiable (e.g. from Java servlets to Enterprise JavaBeans) without substantially impacting client tier 108 by effecting corresponding changes in the command beans.

In order to control how documents are presented to network user system 126, XML tags may be used. To process and dynamically generate XML documents, according to one embodiment, web server tier 106 function is extended by the XML Document Structure Services in application server tier 104. This enables database connectors and integration applications to parse, generate, manipulate, and validate XML-based dynamic content. This content is sent to client tier 108 and interchanged with other servlets. Alternatively, web server tier 106 may be used to selectively apply stylesheets to XML documents when client tier 108 devices do not support XSL stylesheets to XML documents.

It should be understood that the exemplary processes illustrated above may include more or fewer steps or may be performed in the context of a larger processing scheme. Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

We claim:

[1. A system for facilitating the integration and delivery of data available over a network, said system comprising:

at least one user system connected to the network;

one or more host computer components coupled to the network;

at least one publicly available data store and at least one private data store, said at least one publicly available data store and said at least one private data store coupled to said one or more host computer components;

said one or more host computer components configured to acquire public data from said at least one publicly available data store, wherein said public data is determined by private data; acquire said private data from said at least one private data store; integrate said public data and said private data to form integrated data; and format and deliver said integrated data to said user system over the network.]

[2. The system of claim 1, wherein said at least one user system comprises a personal computer.]

[3. The system of claim 1, wherein said at least one user system comprises a wireless device.]

[4. The system of claim 3, wherein said wireless device is a personal digital assistant.]

[5. The system of claim 3, wherein said wireless device is a wireless telephone.]

[6. The system of claim 1, wherein said at least one user system comprises a computer configured to automatically retrieve and store said integrated data.]

[7. The system of claim 1, wherein said at least one user system is configured to display said integrated data using a browser configured to communicate over the network.]

[8. The system of claim 1, wherein said at least one user system is configured to display said integrated data using a network interface device configured to communicate over the network.]

[9. The system of claim 1, wherein said one or more host computer components include a web server and an application server.]

[10. The system of claim 9, wherein said web server comprises:

a data request handler configured to receive data from said at least one user system, invoke and receive data from a network security service, invoke and receive data from a personal profile service, invoke and receive data from a public data service, invoke and receive data from a private data service and format and transfer requested data to said at least one user system;

said network security device configured to be invoked by and return data to said data request handler and to invoke and receive data from said application server;

said personal profile service configured to be invoked by and return data to said request handler and to invoke and receive data from said application server;

a public data service configured to be invoked by and return data to said data request handler and to invoke and receive data from said application server; and a private data service configured to be invoked by and return data to said data request handler and to invoke and receive data from said application server;

wherein said data request handler, said network security service, said personal profile service, said public data service and said private data service communicate with one another.]

[11. The system of claim 9, wherein said application server comprises:

a transactional aggregation utility configured to receive and aggregate transactional data;

a content aggregation utility configured to receive and aggregate content data;

a personal profile utility configured to receive personal profile data;

a network security utility configured to receive and process one or more requests for authentication data;

a content management utility configured to manage content; and an interactive presentation utility configured to process data for presentation;

wherein said a transactional aggregation utility, said content aggregation utility, said personal profile utility, said network security utility, said content management utility and said interactive presentation utility communicate with one another.]

[12. The system of claim 11, wherein said personal profile utility includes a personal profile data store and a personal preferences data store.]

[13. The system of claim 12, wherein said personal profile data store comprises a read-optimized data store.]

[14. The system of claim 11, wherein said transactional aggregation utility receives and aggregates company transactional data and business partner transactional data.]

[15. The system of claim 11, wherein said content aggregation utility receives and aggregates company content data and business partner content data.]

[16. The system of claim 11 wherein said personal profile utility receives user registration data, click-stream data from content pages and click-stream data from transactional pages.]

[17. The system of claim 1, wherein said private data includes private transactional data.]

[18. The system of claim 1, wherein said host computer component comprises an interactive presentation utility configured to format the public data based upon the private data.]

[19. The system of claim 1, wherein said private data includes spending habit data and said public data includes promotion data.]

[20. A method of integrating and delivering data available over a network, said method including the steps of:

acquiring public data from at least one publicly available data store coupled to said network, wherein said public data is determined by private data;

acquiring said private data from at least one private data store coupled to said network;

integrating said public data and said private data to form integrated data; and delivering said integrated data to a user system.]

[21. The method of claim 20, wherein:

said step of acquiring said public data includes the step of interactively updating said public data in accordance with changes to said at least one publicly available data store; or said step of acquiring said private data includes the step of interactively updating said private data in accordance with changes to said at least one private data store.]

[22. The method of claim 20, wherein said integrating step includes the step of customizing said public data and said private data in accordance with a personal profile utility.]

[23. The method of claim 22, wherein said personal profile utility comprises a personal profile data store and a personal preferences data store.]

[24. The method of claim 22 wherein said customizing step includes the step of translating said public data and said private data in accordance with a data request services profile.]

[25. The method of claim 20, wherein said delivering step includes the step of initiating delivery of said integrated data automatically in accordance with a personal profile utility.]

[26. The method of claim 20, wherein said delivering step includes delivering said integrated data to said user system using a browser configured to communicate over the network.]

[27. The method of claim 20, wherein said delivering step includes delivering said integrated data to said user system using a network interface device configured to communicate over the network.]

[28. The method of claim 20, wherein said delivering step includes delivering said integrated data to said user system, said user system comprising a personal computer.]

[29. The method of claim 20, wherein said delivering step includes delivering said integrated data to said user system, said user system comprising a wireless device.]

[30. The method of claim 29, wherein said wireless device is a personal digital assistant.]

[31. The method of claim 29, wherein said wireless device is a wireless telephone.]

[32. The method of claim 20, wherein said delivering step includes delivering said integrated data to said user system, said user system comprising a computer configured to automatically retrieve and store said integrated data.]

[33. The method of claim 20, wherein acquiring private data includes acquiring private transactional data.]

[34. The method of claim 20, wherein said formatting the integrated data includes formatting the public data based upon the private data.]

*35. A system comprising:*

*at least one processor coupled to at least one memory;*

*at least one data aggregation utility having access to at least one public data store and at least one private data store, wherein the at least one data aggregation utility is operative to obtain at least one item of public data from the at least one public data store, to obtain at least one item of private data from the at least one private data store, and to aggregate the at least one item of private data and the at least one item of public data to form integrated data;*

*a content utility management utility operative to incorporate the integrated data into web page data; and*

*an interactive presentation service operative to deliver the web page data to a client computing device;*

*wherein the at least one item of public data is selected based on the at least one item of private data.*

*36. The system of claim 35, wherein the interactive presentation service is further operative to modify the web page data according to a format of a web page.*

*37. The system of claim 36, wherein the web page is associated with the client computing device.*

*38. The system of claim 35, further comprising:*

*a personal preferences data store operative to store preferences of one or more users.*

*39. The system of claim 38, wherein the interactive presentation service is further operative to modify the web page data according to at least one of the preferences of the one or more users.*

*40. The system of claim 35, wherein the at least one aggregation utility comprises a first aggregation utility and a second aggregation utility.*

*41. The system of claim 40, wherein the content utility management utility is operative to manage integrated data formed by the first aggregation utility and integrated data formed by the second aggregation utility.*

*42. The system of claim 35, wherein the at least one data aggregation utility is operative to obtain the at least one item of public data from the at least one public data store and the at least one item of private data from the at least one private data store in response to the system receiving a request for the at least one item of private data from the client computing device.*

*43. The system of claim 36, further comprising:*

*a user authentication system operative to receive user authentication data from the client computing device and to authenticate the user authentication data prior to receiving the request for the at least one item of private data from the client computing device.*

*44. A method comprising:*

*receiving, from a client computing device, a request for display of at least one item of private data;*

*accessing one or more private data content stores to obtain the at least one item of private data;*

*accessing one or more public data content stores;*

*determining, based on the at least one item of private data, at least one item of public data to obtain from the one or more public data content stores;*

*aggregating the at least one item of private data and the at least one item of public data to form integrated data; and*

*transmitting the integrated data to the client computing device.*

*45. The method of claim 44, further comprising:*

*incorporating the integrated data into web page data;*

*wherein transmitting the integrated data to the client computing device comprises transmitting the web page data to the client computing device.*

*46. The method of claim 45, further comprising:*

*modifying the web page data according to a format of a web page prior to transmitting the web page data to the client computing device.*

*47. The method of claim 46, wherein the web page is associated with the client computing device.*

*48. The method of claim 45, further comprising:*

*modifying the web page data according to at least one user preference.*

*49. The method of claim 44, further comprising:*

*receiving user authentication data from the client computing device; and*

*authenticating the user authentication data prior to receiving the request for display of at least one item of private data.*

*50. A computer readable storage device containing computer executable instructions, the instructions comprising:*

*instructions to receive, from a client computing device, a request for display of at least one item of private data;*

*instructions to access one or more private data content stores to obtain the at least one item of private data;*

*instructions to access one or more public data content stores;*

*instructions to determine, based on the at least one item of private data, at least one item of public data to obtain from the one or more public data content stores;*

*instructions to aggregate the at least one item of private data and the at least one item of public data to form integrated data; and*

*instructions to transmit the integrated data to the client computing device.*

*51. The computer readable storage device of claim 50, the instructions further comprising:*

*instructions to incorporate the integrated data into web page data;*

*wherein the instructions to transmit the integrated data to the client computing device comprise instructions to transmit the web page data to the client computing device.*

*52. The computer readable storage device of claim 51, the instructions further comprising:*

*instructions to modify the web page data according to a format of a web page prior to transmitting the web page data to the client computing device.*

*53. The computer readable storage device of claim 51, the instructions further comprising:*

*instructions to modify the web page data according to at least one user preference.*

*54. The computer readable storage device of claim 50, the instructions further comprising:*

*instructions to receive user authentication data from the client computing device; and*

*instructions to authenticate the user authentication data prior to receiving the request for display of at least one item of private data.*

* * * * *